(12) United States Patent
Deng et al.

(10) Patent No.: US 9,992,312 B1
(45) Date of Patent: Jun. 5, 2018

(54) MOBILE DEVICE

(71) Applicant: Quanta Computer Inc., Taoyuan (TW)

(72) Inventors: Ying-Cong Deng, Taoyuan (TW);
Chung-Ting Hung, Taoyuan (TW);
Chin-Lung Tsai, Taoyuan (TW);
Chung-Hung Lo, Taoyuan (TW);
Kuan-Hsien Lee, Taoyuan (TW);
Ching-Hai Chiang, Taoyuan (TW);
Yi-Ling Tseng, Taoyuan (TW)

(73) Assignee: QUANTA COMPUTER INC.,
Guishan Dist., Taoyuan (TW)

( * ) Notice: Subject to any disclaimer, the term of this patent is extended or adjusted under 35 U.S.C. 154(b) by 0 days. days.

(21) Appl. No.: 15/702,854

(22) Filed: Sep. 13, 2017

(30) Foreign Application Priority Data

Jul. 4, 2017 (TW) .............................. 106122351 A

(51) Int. Cl.
*H04M 1/00* (2006.01)
*H04Q 1/24* (2006.01)
*H04M 1/02* (2006.01)

(52) U.S. Cl.
CPC .................................. *H04M 1/026* (2013.01)

(58) Field of Classification Search
CPC ........ H01Q 1/243; H01Q 1/2283; H01Q 1/36;
H01Q 9/06; H04M 1/0202; H04M 1/026

USPC .............. 455/90.3, 556.1, 557, 575.1, 575.8;
343/702, 741, 846
See application file for complete search history.

(56) References Cited

U.S. PATENT DOCUMENTS

| 9,300,055 | B2* | 3/2016 | Tseng | H01Q 21/28 |
| 9,461,686 | B2* | 10/2016 | Yang | H04B 1/3838 |
| 9,680,223 | B2* | 6/2017 | Wu | H01Q 5/378 |
| 9,923,263 | B2* | 3/2018 | Yen | H01Q 9/0421 |
| 2016/0308282 | A1* | 10/2016 | Chang | H01Q 1/243 |

\* cited by examiner

*Primary Examiner* — Quochien B Vuong
(74) *Attorney, Agent, or Firm* — McClure, Qualey & Rodack, LLP

(57) ABSTRACT

A mobile device includes a speaker element and an antenna element. The speaker element includes a conductive portion and a nonconductive portion. The nonconductive portion has a first surface and a second surface which are opposite to each other. The antenna element is adjacent to the nonconductive portion. The antenna element includes a signal source, a first radiation element, and a second radiation element. The signal source is coupled to a feeding point. The first radiation element is coupled to the feeding point. The first radiation element extends from the first surface onto the second surface. The second radiation element is coupled to the feeding point. The second radiation element is disposed on the second surface. The second radiation element is separate from the first radiation element. A coupling gap is formed between the first radiation element and the second radiation element.

10 Claims, 7 Drawing Sheets

MOBILE DEVICE

CROSS REFERENCE TO RELATED APPLICATIONS

This Application claims priority of Taiwan Patent Application No. 106122351 filed on Jul. 4, 2017, the entirety of which is incorporated by reference herein.

BACKGROUND OF THE INVENTION

Field of the Invention

The disclosure generally relates to a mobile device, and specifically, to a mobile device for integrating a speaker element with an antenna element.

Description of the Related Art

With the progress being made in mobile communication technology, mobile devices such as portable computers, mobile phones, tablet computers, multimedia players, and other hybrid functional mobile devices have become common. To satisfy the demands from users, mobile devices can usually perform wireless communication functions. Some functions cover a large wireless communication area; for example, mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some functions cover a small wireless communication area; for example, mobile phones using Wi-Fi and Bluetooth systems and using frequency bands of 2.4 GHz, 5.2 GHz, and 5.8 GHz.

An antenna for supporting wireless communication is an indispensable element in a mobile device. However, the inner space of the mobile device is too small to accommodate every radiation branch of the antenna. Nowadays, it has become a critical challenge for engineers to design a wideband antenna element that is small in size.

BRIEF SUMMARY OF THE INVENTION

In a preferred embodiment, the disclosure is directed to a mobile device including a speaker element and an antenna element. The speaker element includes a conductive portion and a nonconductive portion. The nonconductive portion of the speaker element has a first surface and a second surface which are opposite to each other. The antenna element is disposed adjacent to the nonconductive portion of the speaker element. The antenna element includes a signal source, a first radiation element, and a second radiation element. The signal source is coupled to a feeding point. The first radiation element is coupled to the feeding point. The first radiation element extends from the first surface of the nonconductive portion onto the second surface of the nonconductive portion. The second radiation element is coupled to the feeding point. The second radiation element is disposed on the second surface of the nonconductive portion. The second radiation element is separate from the first radiation element. A coupling gap is formed between the first radiation element and the second radiation element.

In some embodiments, the first radiation element includes a first branch disposed on the first surface, and a second branch disposed on the second surface. The first branch substantially has an N-shape. The second branch substantially has a U-shape.

In some embodiments, the second radiation element includes a connection branch, a third branch, a fourth branch, and a fifth branch. Each of the third branch, the fourth branch, and the fifth branch is coupled through the connection branch to the feeding point.

In some embodiments, the third branch and the fourth branch are coupled to an end of the connection branch. The third branch and the fourth branch extend in opposite directions, such that a combination of the third branch, the fourth branch, and the connection branch substantially has a T-shape.

In some embodiments, the connection branch includes a widening portion disposed adjacent to the feeding point.

In some embodiments, the fifth branch is coupled to the widening portion of the connection branch. The fifth branch substantially has a straight-line shape and is parallel to the fourth branch.

In some embodiments, the antenna element further includes a tuning circuit. The tuning circuit includes an open-circuited element, an inductor, a capacitor, a short-circuited element, and a switch element. The open-circuited element, the inductor, the capacitor, and the short-circuited element are coupled to the signal source. The switch element selectively couples one of the open-circuited element, the inductor, the capacitor, and the short-circuited element to a ground voltage.

In some embodiments, the antenna element further includes a first matching circuit. The first matching circuit is coupled in series between the feeding point and the signal source.

In some embodiments, the antenna element further includes a second matching circuit. The feeding point is coupled through the second matching circuit to a ground voltage.

In some embodiments, the antenna element covers a low-frequency band from 700 MHz to 960 MHz, and a high-frequency band from 1710 MHz to 3000 MHz.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the purposes, features and advantages of the invention, the embodiments and figures of the invention are described in detail below.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

Figure 1A:
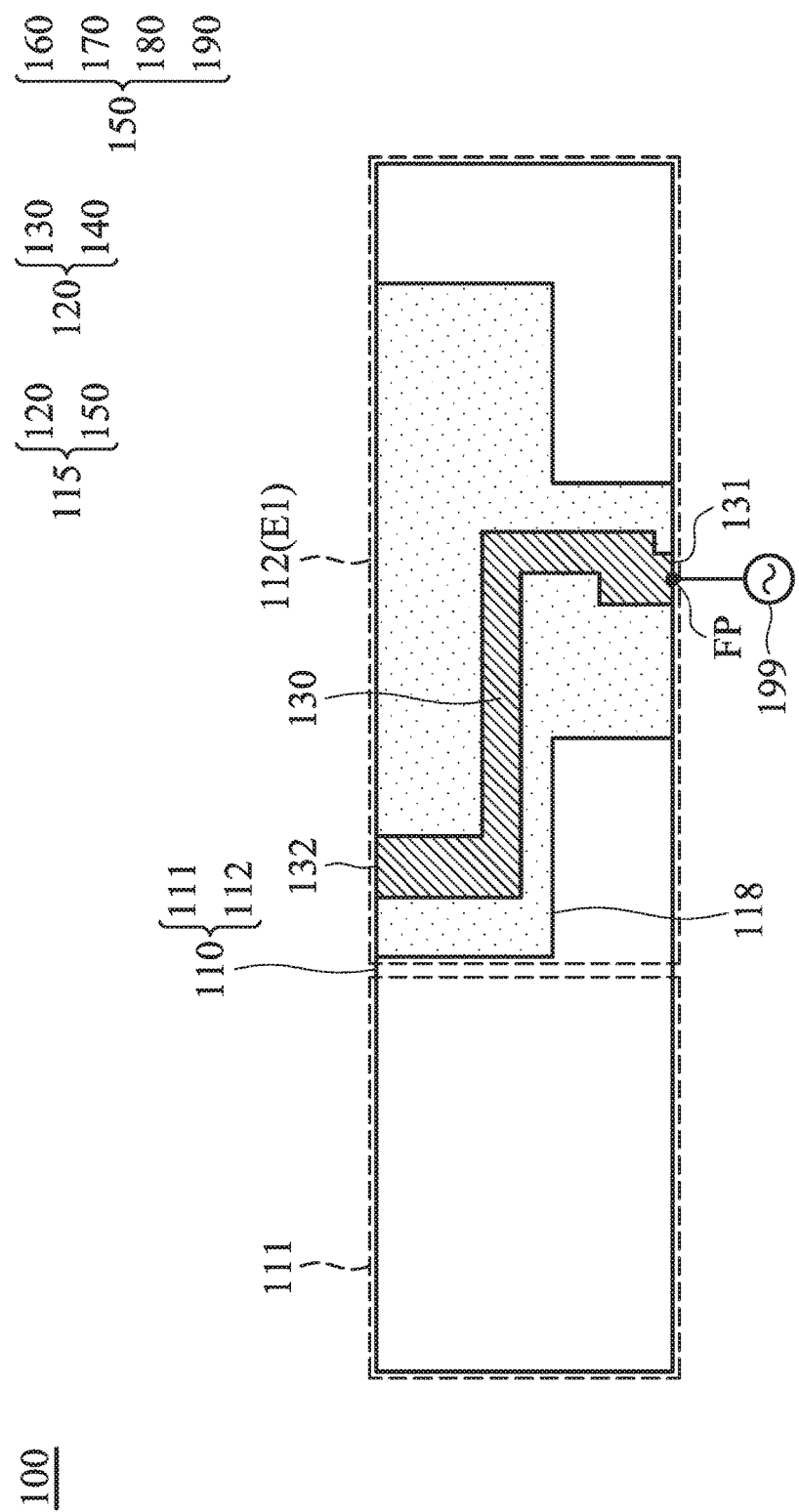
FIG. 1A is a front view of a mobile device according to an embodiment of the invention.
Figure 1B:
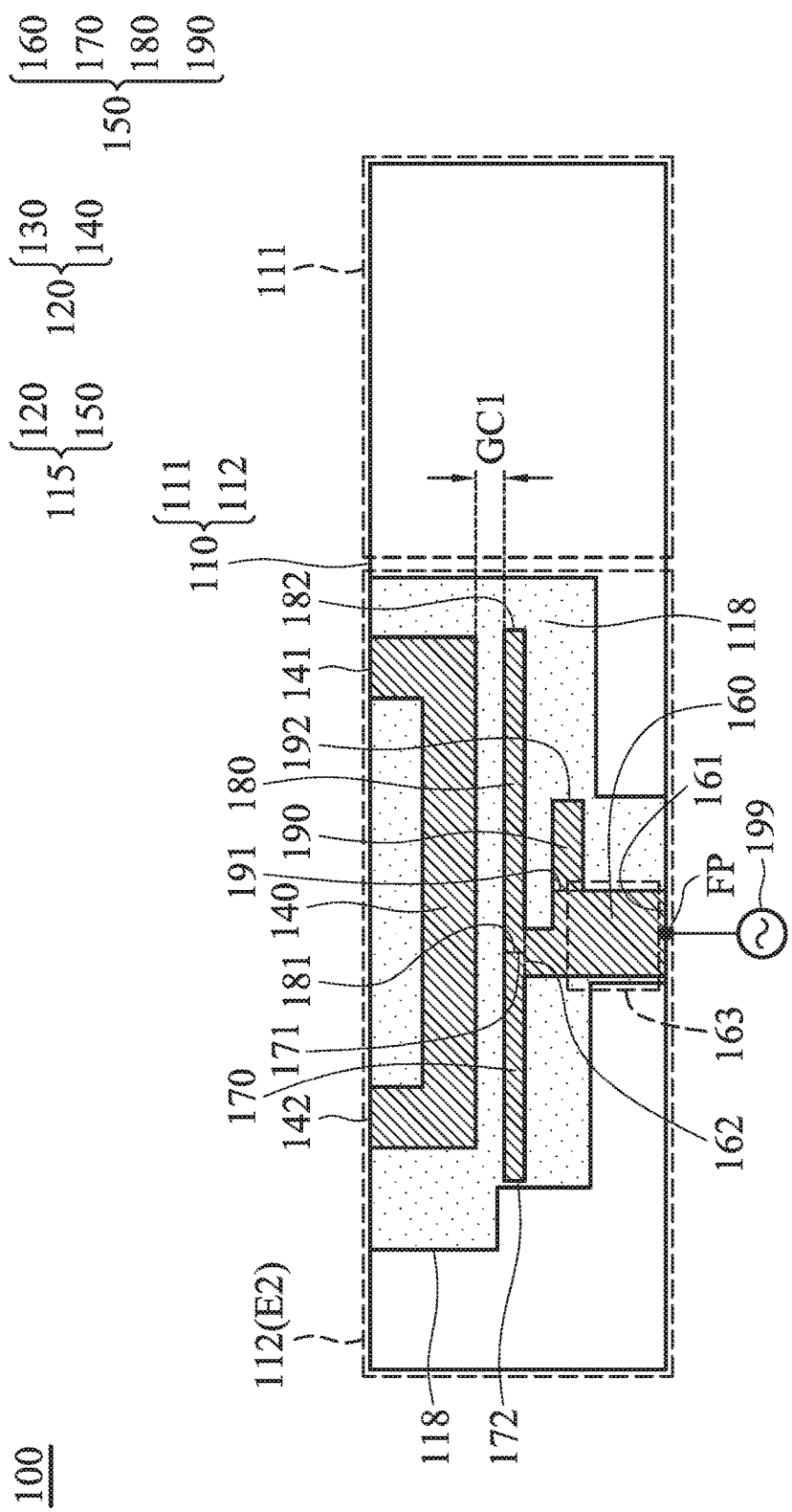
FIG. 1B is a back view of a mobile device according to an embodiment of the invention.

FIG. 1A is a front view of a mobile device 100 according to an embodiment of the invention. FIG. 1B is a back view of the mobile device 100 according to an embodiment of the invention. Please refer to FIG. 1A and FIG. 1B together. The mobile device 100 may be a smart phone, a tablet computer, or a notebook computer. As shown in FIG. 1A and FIG. 1B, the mobile device 100 at least includes a speaker element 110 and an antenna element 115. The antenna element 115 is integrated with the speaker element 110. The speaker element 110 includes a conductive portion 111 and a nonconductive portion 112. For example, a speaker control circuit may be disposed in the conductive portion 111 of the speaker element 110, and the nonconductive portion 112 of the speaker element 110 may be a plastic resonance empty-box. Sound-wave energy may resonate in the plastic resonance empty-box and be enhanced. The shape and the size of the speaker element 110 are not limited in the invention. For example, the speaker element 110 may have a cuboid shape or an irregular 3D (Three-Dimensional) shape. The antenna element 115 is disposed adjacent to the nonconductive portion 112 of the speaker element 110. In some embodiments, each radiation element of the antenna element 115 surrounds the nonconductive portion 112 of the speaker element 110, so as to form a 3D antenna structure. It should be noted that the mobile device 100 may further include other components, such as a processor, a touch control panel, a battery module, and a housing, although they are not displayed in FIG. 1A and FIG. 1B.

The antenna element 115 includes a signal source 199, a first radiation element 120, and a second radiation element 150. The first radiation element 120 and the second radiation element 150 are made of metal materials. The signal source 199 may be an RF (Radio Frequency) module for generating a transmission signal or processing a reception signal. The signal source 199 is coupled to a feeding point FP. The feeding point FP is further coupled to the first radiation element 120 and the second radiation element 150, so as to excite the antenna element 115. Specifically, the nonconductive portion 112 of the speaker element 110 has a first surface E1 and a second surface E2 which are opposite to each other. The first radiation element 120 extends from the first surface E1 of the nonconductive portion 112 onto the second surface E2 of the nonconductive portion 112. The second radiation element 150 is disposed on only the second surface E2 of the nonconductive portion 112. The second radiation element 150 is completely separate from the first radiation element 120. A coupling gap GC1 is formed between the first radiation element 120 and the second radiation element 150. In some embodiments, the antenna element 115 further includes an FPCB (Flexible Printed Circuit Board) 118. The first radiation element 120 and the second radiation element 150 are formed on the FPCB 118, and the FPCB 118 is affixed to the first surface E1 and the second surface E2 of the nonconductive portion 112. In alternative embodiments, the first radiation element 120 and the second radiation element 150 are directly formed on the first surface E1 and the second surface E2 of the nonconductive portion 112 by using LDS (Laser Direct Structuring) technology, without using any FPCB 118.

It should be noted that the shapes and the sizes of the first radiation element 120 and the second radiation element 150 are tunable according to different requirements. The following embodiments will introduce the detailed structure features of the first radiation element 120 and the second radiation element 150, and they are merely exemplary, rather than limitations of the invention.

The first radiation element 120 includes a first branch 130 and a second branch 140. The first branch 130 is disposed on the first surface E1 of the nonconductive portion 112. The second branch 140 is disposed on the second surface E2 of the nonconductive portion 112. The first branch 130 may substantially have an N-shape. The first branch 130 has a first end 131 and a second end 132. The first end 131 of the first branch 130 is coupled to the feeding point FP. The second branch 140 may substantially have a U-shape. The second branch 140 has a first end 141 and a second end 142. The first end 141 of the second branch 140 is coupled to the second end 132 of the first branch 130. The second end 142 of the second branch 140 is open and extends to an edge of the nonconductive portion 112.

The second radiation element 150 includes a connection branch 160, a third branch 170, a fourth branch 180, and a fifth branch 190, which are all disposed on the second surface E2 of the nonconductive portion 112. Each of the third branch 170, the fourth branch 180, and the fifth branch 190 is coupled through the connection branch 160 to the feeding point FP. The connection branch 160 may substantially have a straight-line shape. The connection branch 160 has a first end 161 and a second end 162. The first end 161 of the connection branch 160 is coupled to the feeding point FP. The connection branch 160 includes a widening portion 163 disposed adjacent to the feeding point FP. The widening portion 163 may substantially have a rectangular shape, such that the width of the first end 161 is greater than the width of the second end 162. For example, the width of the first end 161 may be 1 to 2 times the width of the second end 162, so as to fine-tune the high-frequency impedance matching of the antenna element 115. The third branch 170 may substantially have a straight-line shape. The third branch 170 has a first end 171 and a second end 172. The first end 171 of the third branch 170 is coupled to the second end 162 of the connection branch 160. The second end 172 of the third branch 170 is open. The fourth branch 180 may substantially have a straight-line shape. The fourth branch 180 has a first end 181 and a second end 182. The first end 181 of the fourth branch 180 is coupled to the second end 162 of the connection branch 160 and the first end 171 of the third branch 170. The second end 182 of the fourth branch 180 is open. The length of the fourth branch 180 is slightly greater than the length of the third branch 170. The second end 172 of the third branch 170 and the second end 182 of the fourth branch 180 extend in opposite directions, such that a combination of the third branch 170, the fourth branch 180, and the connection branch 160 substantially has a T-shape. The fifth branch 190 may substantially have a straight-line shape and be parallel to the fourth branch 180. The fifth branch 190 has a first end 191 and a second end 192. The first end 191 of the fifth branch 190 is coupled to the widening portion 163 of the connection branch 160. The second end 192 of the fifth branch 190 is open. The length of the fifth branch 190 is smaller than the length of the third branch 170 or the length of the fourth branch 180. For example, the length of the fourth branch 180 may be 2 to 3 times the length of the fifth branch 190.

Figure 2:
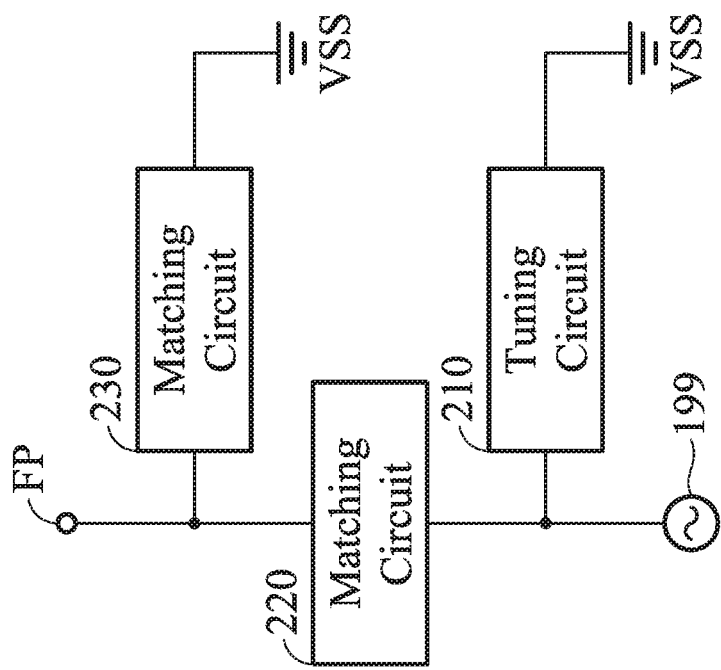
FIG. 2 is a diagram of a portion of an antenna element according to an embodiment of the invention.

FIG. 2 is a diagram of a portion of the antenna element 115 according to an embodiment of the invention. In the embodiment of FIG. 2, the antenna element 115 further includes a tuning circuit 210, a first matching circuit 220, and a second matching circuit 230. The signal source 199 may be coupled through the tuning circuit 210 to a ground voltage VSS. The first matching circuit 220 may be coupled in series between the feeding point FP and the signal source 199. The feeding point FP may be coupled through the second matching circuit 230 to the ground voltage VSS. For example, the tuning circuit 210 may be implemented with a variable capacitor or a variable inductor, so as to provide different impedance values. Each of the first matching circuit 220 and the second matching circuit 230 may include one or more chip capacitors and/or one or more chip inductors, so as to fine-tune the high/low-frequency impedance matching of the antenna element 115. In alternative embodiments, the first matching circuit 220 is replaced with a simple short-circuited element, and the second matching circuit 230 is replaced with a simple open-circuited element. It should be noted that the tuning circuit 210, the first matching circuit 220, and the second matching circuit 230 are optional. In other embodiments, the tuning circuit 210, the first matching circuit 220, and the second matching circuit 230 are all removed, such that the signal source 199 is directly connected to the feeding point FP.

Figure 3:
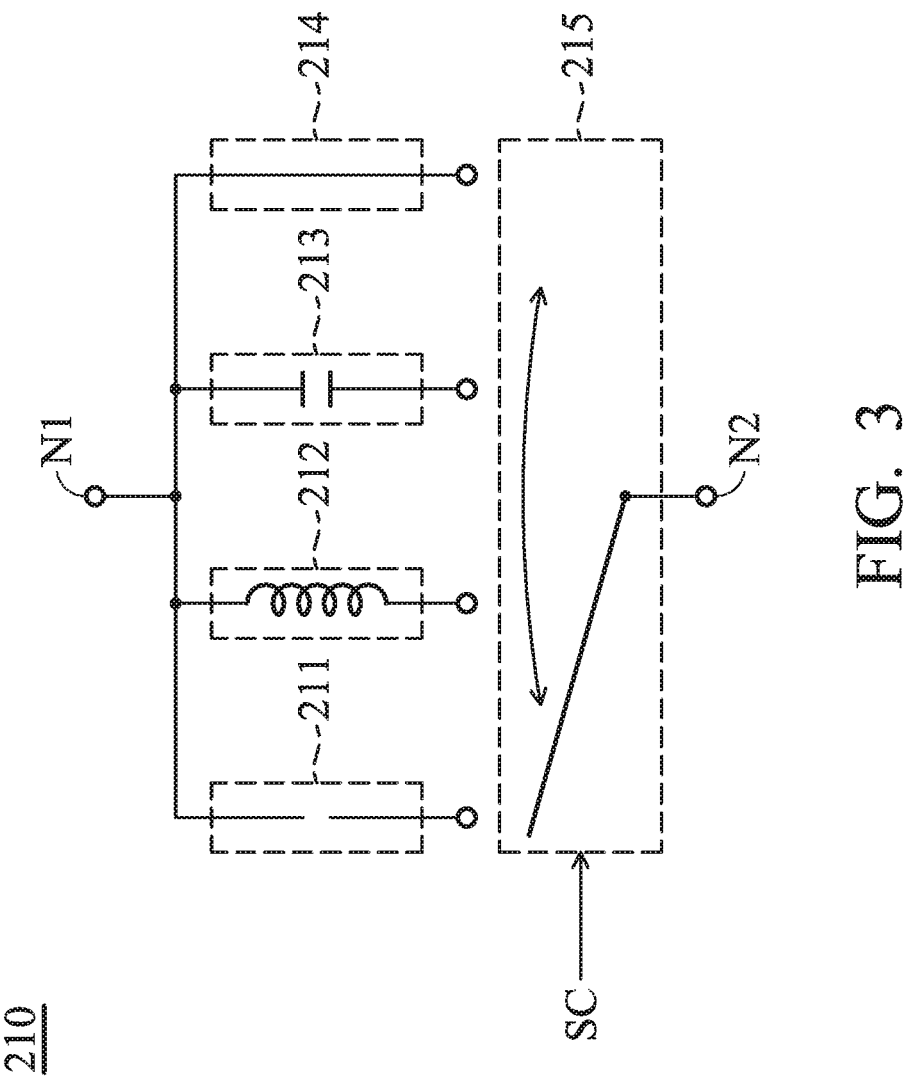
FIG. 3 is a diagram of a tuning circuit according to an embodiment of the invention.

FIG. 3 is a diagram of the tuning circuit 210 according to an embodiment of the invention. It should be noted that the configuration of the tuning circuit 210 of FIG. 3 is merely exemplary, rather than limitations of the invention. In the embodiment of FIG. 3, the tuning circuit 210 includes an open-circuited element 211, an inductor 212, a capacitor 213, a short-circuited element 214, and a switch element 215. The open-circuited element 211, the inductor 212, the capacitor 213, and the short-circuited element 214 are all coupled to a first terminal N1 of the tuning circuit 210. The switch element 215 is coupled to a second terminal N2 of the tuning circuit 210. The switch element 215 can switch between the open-circuited element 211, the inductor 212, the capacitor 213, and the short-circuited element 214. For example, the switch element 215 can selectively couple one of the open-circuited element 211, the inductor 212, the capacitor 213, and the short-circuited element 214 to the second terminal N2 of the tuning circuit 210, according to a control signal SC. The control signal SC may be generated according to a user's instruction by a processor. If the tuning circuit 210 of FIG. 3 is applied to the embodiment of FIG. 2, the first terminal N1 of the tuning circuit 210 will be coupled to the signal source 199, and the second terminal N2 of the tuning circuit 210 will be coupled to the ground voltage VSS.

Figure 4:
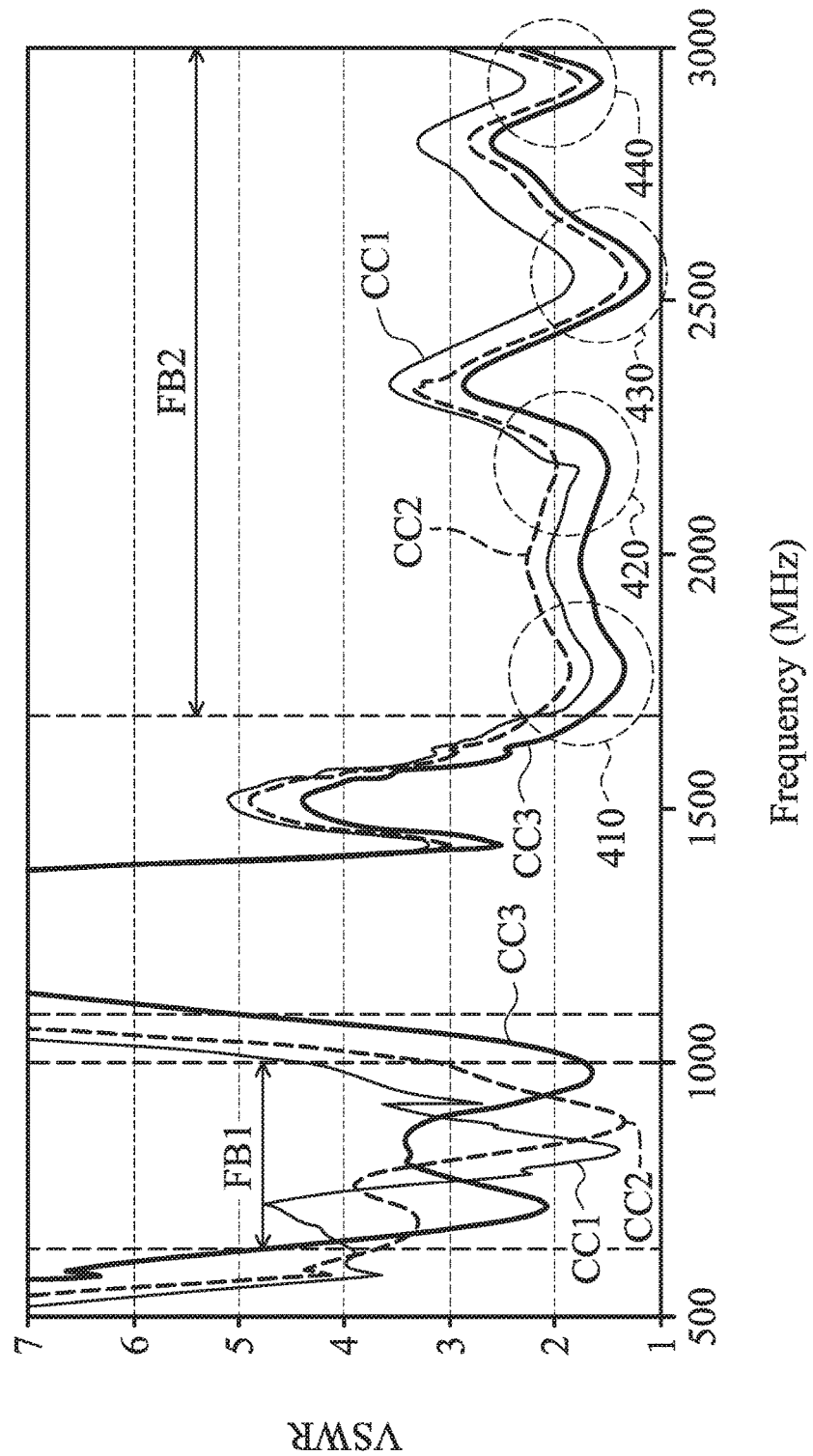
FIG. 4 is a diagram of VSWR (Voltage Standing Wave Ratio) of an antenna element of a mobile device according to an embodiment of the invention.

FIG. 4 is a diagram of VSWR (Voltage Standing Wave Ratio) of the antenna element 115 of the mobile device 100 according to an embodiment of the invention. The horizontal axis represents operation frequency (MHz), and the vertical axis represents the VSWR. As shown in FIG. 4, a first curve CC1 represents the operation characteristic of the antenna element 115 when the switch element 215 selects the capacitor 213, a second curve CC2 represents the operation characteristic of the antenna element 115 when the switch element 215 selects the open-circuited element 211, and a third curve CC3 represents the operation characteristic of the antenna element 115 when the switch element 215 selects the inductor 212. According to the measurement of FIG. 4, the antenna element 115 can cover a low-frequency band FB1 from 700 MHz to 960 MHz, and a high-frequency band FB2 from 1710 MHz to 3000 MHz. The tuning circuit 210 is mainly configured to increase the bandwidth of the low-frequency band FB1. With such a design, the antenna element 115 of the mobile device 100 can support at least LTE (Long Term Evolution) wideband operation.

Please refer to FIGS. 1 to 4 together. With respect to the antenna theory, the low-frequency band FB1 of the antenna element 115 is excited by the first radiation element 120, and the high-frequency band FB2 of the antenna element 115 is excited by the first radiation element 120 and the second radiation element 150 together. In some embodiments, the element sizes of the antenna element 115 are as follows.

The total length of the first branch 130 and the second branch 140 of the first radiation element 120 (i.e., the total length from the first end 131 through the second end 132 and the first end 141 to the second end 142) may be substantially equal to 0.25 wavelength ($\lambda/4$) of a central frequency of the low-frequency band FB1. The high-frequency band FB2 may include a first resonant mode 410 (at about 1710 MHz), a second resonant mode 420 (at about 2200 MHz), a third resonant mode 430 (at about 2550 MHz), and a fourth resonant mode 440 (at about 3000 MHz). The total length of the connection branch 160 and the third branch 170 of the second radiation element 150 (i.e., the total length from the first end 161 through the second end 162 and the first end 171 to the second end 172) may be substantially equal to 0.25 wavelength ($\lambda/4$) of the second resonant mode 420 of the high-frequency band FB2. The total length of the connection branch 160 and the fourth branch 180 of the second radiation element 150 (i.e., the total length from the first end 161 through the second end 162 and the first end 181 to the second end 182) may be substantially equal to 0.25 wavelength ($\lambda/4$) of the first resonant mode 410 of the high-frequency band FB2. The total length of the connection branch 160 and the fifth branch 190 of the second radiation element 150 (i.e., the total length from the first end 161 through the first end 191 to the second end 192) may be substantially equal to 0.25 wavelength ($\lambda/4$) of the fourth resonant mode 440 of the high-frequency band FB2. The third resonant mode 430 of the high-frequency band FB2 may be generated by double-frequency resonance of the first branch 130 and the second branch 140 of the first radiation element 120. The width of the coupling gap GC1 between the first radiation element 120 and the second radiation element 150 may be from 1 mm to 5 mm. The aforementioned width range can maintain a proper coupling amount between the two radiation elements. The above element sizes are calculated and obtained according to many experiment results, and they are arranged for optimizing the operation bandwidth and the impedance matching of the antenna element 115.

Figure 5C:
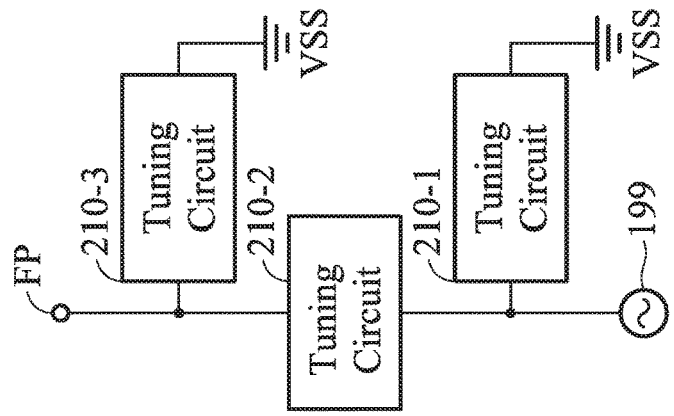
FIG. 5C is a diagram of a portion of an antenna element according to another embodiment of the invention.
Figure 5B:
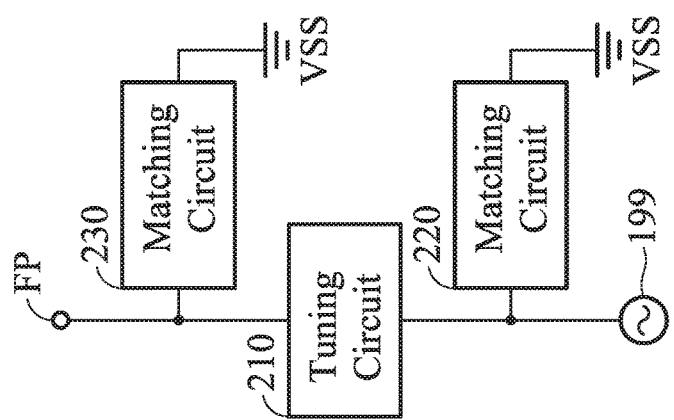
FIG. 5B is a diagram of a portion of an antenna element according to another embodiment of the invention.
Figure 5A:
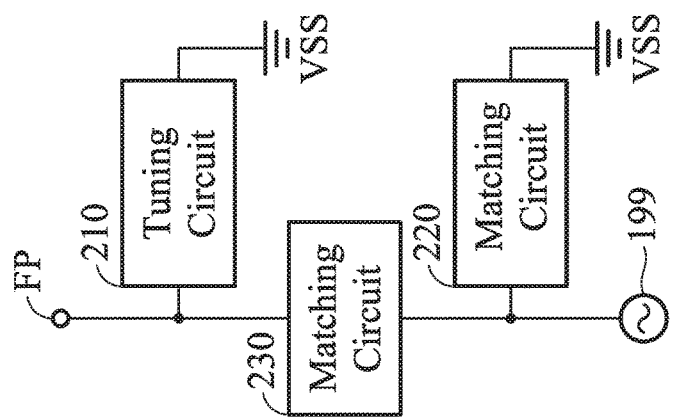
FIG. 5A is a diagram of a portion of an antenna element according to another embodiment of the invention.

FIG. 5A is a diagram of a portion of the antenna element 115 according to another embodiment of the invention. In the embodiment of FIG. 5A, the signal source 199 is coupled through the first matching circuit 220 to the ground voltage VSS, the second matching circuit 230 is coupled in series between the feeding point FP and the signal source 199, and the feeding point FP is coupled through the tuning circuit 210 to the ground voltage VSS. If the tuning circuit 210 of FIG. 3 is applied to the embodiment of FIG. 5A, the first terminal N1 of the tuning circuit 210 will be coupled to the feeding point FP, and the second terminal N2 of the tuning circuit 210 will be coupled to the ground voltage VSS.

FIG. 5B is a diagram of a portion of the antenna element 115 according to another embodiment of the invention. In the embodiment of FIG. 5B, the signal source 199 is coupled through the first matching circuit 220 to the ground voltage VSS, the tuning circuit 210 is coupled in series between the feeding point FP and the signal source 199, and the feeding point FP is coupled through the second matching circuit 230 to the ground voltage VSS. If the tuning circuit 210 of FIG. 3 is applied to the embodiment of FIG. 5B, the first terminal N1 of the tuning circuit 210 will be coupled to the signal source 199, and the second terminal N2 of the tuning circuit 210 will be coupled to the feeding point FP.

FIG. 5C is a diagram of a portion of the antenna element 115 according to another embodiment of the invention. In the embodiment of FIG. 5C, the antenna element 115 further includes a first tuning circuit 210-1, a second tuning circuit 210-2, and a third tuning circuit 210-3. The signal source 199 is coupled through the first tuning circuit 210-1 to the ground voltage VSS, the second tuning circuit 210-2 is coupled in series between the feeding point FP and the signal source 199, and the feeding point FP is coupled through the third tuning circuit 210-3 to the ground voltage VSS. The detailed structure of each of the first tuning circuit 210-1, the second tuning circuit 210-2, and the third tuning circuit 210-3 has been described in the embodiment of FIG. 3. The first tuning circuit 210-1, the second tuning circuit 210-2, and the third tuning circuit 210-3 are used together to provide a wide range of frequency adjustments. The embodiments of FIG. 5A, FIG. 5B, and FIG. 5C illustrate a variety of configurations of feeding circuits, and they can meet the requirements of different impedance matching and different operation frequency bands.

Figure 6:
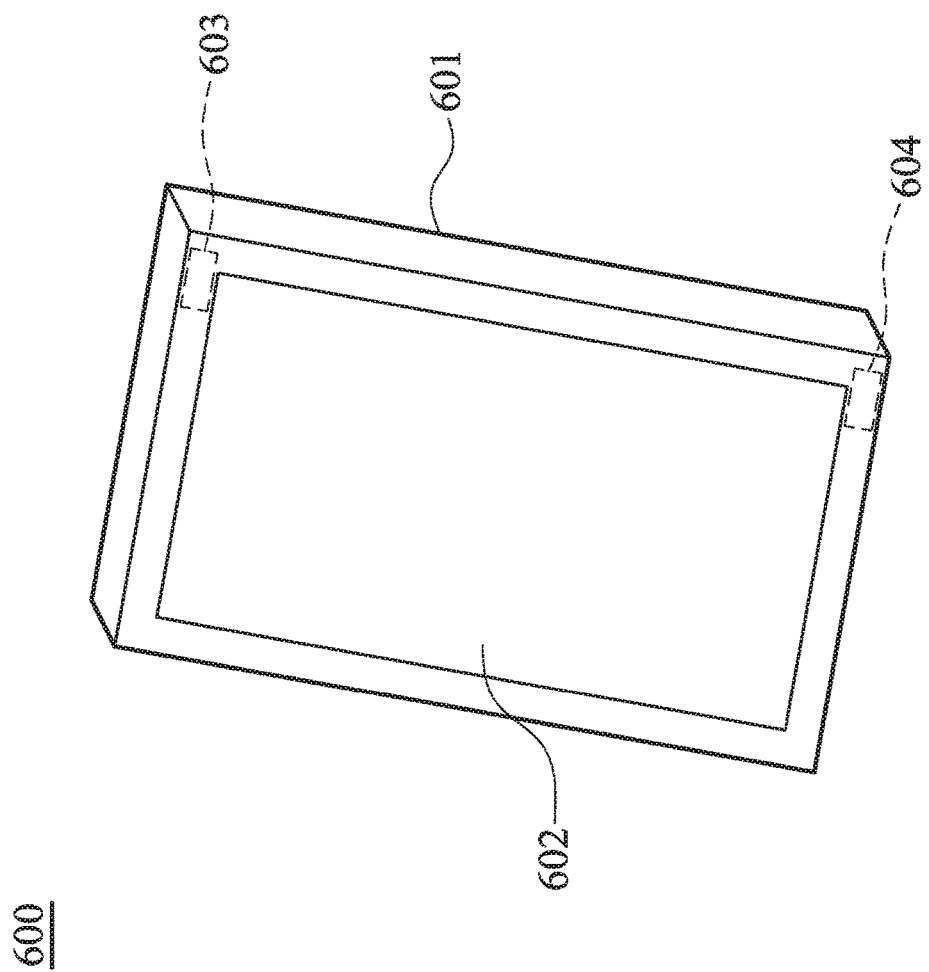
FIG. 6 is a diagram of a mobile device according to another embodiment of the invention.

FIG. 6 is a diagram of a mobile device 600 according to another embodiment of the invention. In the embodiment of FIG. 6, the mobile device 600 is a tablet computer or a smart phone, and the aforementioned speaker element 110 and antenna element 115 are applied to the mobile device 600. Specifically, the first surface E1 of the nonconductive portion 112 of the speaker element 110 is arranged toward a back cover 601 of the mobile device 600, and the second surface E2 of the nonconductive portion 112 of the speaker element 110 is arranged toward a display device 602 of the mobile device 600. With such a design, the SAR (Specific Absorption Rate) of the antenna element 115 is effectively reduced in the high-frequency band FB2 because the second radiation element 150 of the antenna element 115 is adjacent to the display device 602, instead of the back cover 601. In some embodiments, the aforementioned speaker element 110 and antenna element 115 are disposed at a top side 603 or a bottom side 604 of the mobile device 600. Alternatively, the aforementioned speaker element 110 and antenna element 115 may be disposed at both the top side 603 and the bottom side 604 of the mobile device 600 using MIMO (Multi-Input and Multi-Output) technology.

The invention proposes a novel mobile device. By designing an antenna element on a speaker element, the antenna element naturally forms a 3D structure for reducing the whole antenna size, and it is still capable of covering LTE wideband operation. According to the practical measurement, the total operation bandwidth of the antenna element is significantly increased by using a design in which a first radiation element and a second radiation element are separate from each other and a coupling gap is formed therebetween. In conclusion, the invention has one or more of the following advantages: a small size, wideband, and low-SAR characteristics. Therefore, the invention is suitable for application in a variety of mobile communication devices.

Note that the above element sizes, element shapes, and frequency ranges are not limitations of the invention. An antenna designer can adjust these settings or values according to different requirements. It should be understood that the mobile device and the antenna element of the invention are not limited to the configurations of FIGS. 1-6. The invention may merely include any one or more features of any one or more embodiments of FIGS. 1-6. In other words, not all of the features shown in the figures should be implemented in the mobile device and the antenna element of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with a true scope of the disclosed embodiments being indicated by the following claims and their equivalents.

What is claimed is:

1. A mobile device, comprising:
a speaker element, comprising a conductive portion and a nonconductive portion, wherein the nonconductive portion of the speaker element has a first surface and a second surface which are opposite to each other; and
an antenna element, disposed adjacent to the nonconductive portion of the speaker element, wherein the antenna element comprises:
a signal source, coupled to a feeding point;
a first radiation element, coupled to the feeding point, wherein the first radiation element extends from the first surface of the nonconductive portion onto the second surface of the nonconductive portion; and
a second radiation element, coupled to the feeding point, wherein the second radiation element is disposed on the second surface of the nonconductive portion;
wherein the second radiation element is separate from the first radiation element, and a coupling gap is formed between the first radiation element and the second radiation element.

2. The mobile device as claimed in claim 1, wherein the first radiation element comprises a first branch disposed on the first surface, and a second branch disposed on the second surface, wherein the first branch substantially has an N-shape, and the second branch substantially has a U-shape.

3. The mobile device as claimed in claim 1, wherein the second radiation element comprises a connection branch, a third branch, a fourth branch, and a fifth branch, wherein each of the third branch, the fourth branch, and the fifth branch is coupled through the connection branch to the feeding point.

4. The mobile device as claimed in claim 3, wherein the third branch and the fourth branch are coupled to an end of the connection branch, wherein the third branch and the fourth branch extend in opposite directions, such that a combination of the third branch, the fourth branch, and the connection branch substantially has a T-shape.

5. The mobile device as claimed in claim 3, wherein the connection branch comprises a widening portion disposed adjacent to the feeding point.

6. The mobile device as claimed in claim 5, wherein the fifth branch is coupled to the widening portion of the connection branch, wherein the fifth branch substantially has a straight-line shape and is parallel to the fourth branch.

7. The mobile device as claimed in claim 1, wherein the antenna element further comprises a tuning circuit which comprises:
  an open-circuited element, coupled to the signal source;
  an inductor, coupled to the signal source;
  a capacitor, coupled to the signal source;
  a short-circuited element, coupled to the signal source; and
  a switch element, selectively coupling one of the open-circuited element, the inductor, the capacitor, and the short-circuited element to a ground voltage.

8. The mobile device as claimed in claim 1, wherein the antenna element further comprises a first matching circuit, and the first matching circuit is coupled in series between the feeding point and the signal source.

9. The mobile device as claimed in claim 1, wherein the antenna element further comprises a second matching circuit, and the feeding point is coupled through the second matching circuit to a ground voltage.

10. The mobile device as claimed in claim 1, wherein the antenna element covers a low-frequency band from 700 MHz to 960 MHz, and a high-frequency band from 1710 MHz to 3000 MHz.

* * * * *